United States Patent Office 3,401,130
Patented Sept. 10, 1968

3,401,130
PROCESS OF PREPARING OIL-CONTAINING WATER SOLUBLE BINDERS SUITABLE FOR THE PREPARATION OF BINDER COMPOSITIONS
Christiaan Korf, Caan van Necklaan, Rijswijk, Netherlands, assignor to Archer Daniels Midland Company
No Drawing. Continuation of abandoned application Ser. No. 482,612, Aug. 25, 1965, which is a continuation-in-part of application Ser. No. 124,012, July 14, 1961. This application July 7, 1967, Ser. No. 651,948
Claims priority, application Netherlands, July 16, 1960, 253,889
8 Claims. (Cl. 260—23)

ABSTRACT OF THE DISCLOSURE

Novel water-dispersible binders for coating compositions prepared from mixtures of drying or semi-drying oils with vinyl substituted aromatic compounds. The oil containing the vinyl compound is heated with an unsaturated dicarboxylic acid or anhydride mixed with a lyotropically acting organic solvent and substantially or totally neutralized with a nitrogen containing base.

This application is a continuation of copending application Ser. No. 482,612 filed Aug. 25, 1965, and now abandoned, which application in turn is a continuation-in-part of copending application Ser. No. 124,012, filed on July 14, 1961, now abandoned.

The present invention relates to the preparation of water-dispersible binders for coating compositions, and more particularly, to such binders incorporating chemically modified drying or semi-drying oil adducts.

In the paint and lacquer industries it is desirable to replace the conventional inflammable solvents, insofar as possible, with non-inflammable, odorless diluents. Such may be effected, insofar as flammability characteristics are concerned, by the use of chlorinated hydrocarbon solvents. The use of such materials, however, is not entirely satisfactory, in view of the toxicities, odors, and risks of corrosion (by the liberation of hydrochloric acid) associated with such chlorinated hydrocarbons.

The disadvantages inherent in the use of chlorinated hydrocarbon solvents may be obviated by employing water as the outer phase of coating compositions. Hence, aqueous systems have heretofore been proposed incorporating water-insoluble artificial resins dispersed therein. Such artificial resin dispersions are capable of drying to a moderate gloss with slight pigmentation. However, coating compositions incorporating such artificial resin dispersions and containing higher pigment concentrations dry with little or no gloss. Thus it is not feasible, utilizing such resin dispersions, to prepare paints having both high covering power and high gloss characteristics.

Phthalate resin emulsion paints have also been proposed in which a phthalate acid resin is emulsified in water with the aid of emulsifiers and stabilizers. The dispersed phases of such emulsions consist of particles having relatively large diameters, the pigmented films deposited therefrom not, therefore, displaying a gloss after drying. Consequently such emulsion paints, apart from other disadvantages thereof, cannot be utilized for glossy coatings.

Prior efforts to form solubilizing phthalate resins modified with drying or non-drying oils have resulted in the formation of relatively turbid emulsions, the particle sizes in the dispersed phases of such emulsions depending on the hydrophilic groups of the resins dispersed and the choice of the emulsifier employed. Moreover, films deposited from such emulsions frequently display insufficient resistance to water.

Various specific procedures have been described for the preparation of water-emulsifiable phthalate resins. In one such method the use of alkyd resins incorporating chemically combined hydrophilic groups, e.g., from polyethylene glycol, has been proposed. In other systems, e.g., that described in German Patent 943,715, emulsions containing the reaction product of a phthalate resin with an aqueous phenol aldehyde resin have been described. The latter resins are, however, solely suitable for application in stoving lacquers, and the stability and wetting characteristics thereof are unsatisfactory.

Processes have also been disclosed, in U.S. Patents 2,262,923; 2,285,646; and 2,188,882 through 2,188,890, for preparing coating compositions incorporating binders resulting from the addition of acyclic unsaturated carboxylic acids, e.g., dicarboxylic acids having less than 10 carbon atoms in their carbon chains, to unsaturated, non-conjugated and non-hydroxylated drying oils containing fatty acid residues. Such oils may be made water-soluble by the addition of a nitrogen base. However, the drying times of coating compositions containing the same are not appreciably shorter than linseed oil or linseed oil-stand oil compositions. Moreover, the former compositions lose drying power during storage and cannot be diluted with water in all ratios.

It has also been proposed, in U.S. Patent 2,992,197, for example, to provide water-soluble binders for coating compositions by reacting drying oils with unsaturated aliphatic or cycloaliphatic, or vinyl aromatic, hydrocarbons, and thereafter reacting the products thus formed with alpha, beta-unsaturated dicarboxylic acids or anhydrides. Such binders (like those described above) do not, when conventionally prepared, impart adequate drying properties to coating compositions containing the same; moreover, such compositions do not, upon prolonged storage, possess stable drying characteristics.

It is accordingly among the objects of the present invention to provide water-dispersible binders for coating compositions, which possess improved drying properties and drying stability characteristics.

Other objects and advantages of the invention will be apparent upon consideration of the following detailed description of preferred embodiments thereof.

I have found that improved water dispersible binders may be provided, which binders possess excellent drying properties and drying stability characteristics, by reacting a modified drying or semi-drying oil prepared by reaction of such an oil with a vinyl aromatic compound, viz., styrene, methyl styrene or vinyl toluene, in particular proportions such that the vinyl aromatic compound constitutes from 35% to 55% of the modified oil, and an acyclic unsaturated dicarboxylic acid or anhydride within a temperaure range of from 170° C. to 260° C., and particularly between temperatures of 220° C. and 260° C. The adducts thus formed are solubilized by reaction with a nitrogen base and dissolved in a lyotropically acting organic solvent to prepare binder compositions which, upon admixture with appropriate pigments and/or fillers and, eventually, synthetic emulsions, provide desirable paints and other coating compositions.

Parenthetically, it is intended that all parts and percentages specified above or identified hereinafter are given by weight, unless otherwise indicated.

By modifying a drying or semi-drying oil with a vinyl aromatic compound in the indicated proportions, and reacting the resulting product at temperatures within the range specified above, binder compositions having outstanding drying properties, stable drying characteristics, and excellent water solubilities, are provided. Hence, as indicated in Example 2 below, a coating composition containing a binder incorporating a modified oil containing 45% of a vinyl aromatic, in accordance with the invention, dried within 10 hours, whereas a similar composition including a binder incorporating only 30% of the vinyl aromatic compound, required a 3-day drying time. Additionally, the former product possessed the same drying time after one year's storage, whereas the latter material required at least 7 days to dry, after a year's storage.

Binder compositions may in some cases be prepared by reacting the modified drying or semi-drying oils with unsaturated dicarboxylic acids at temperatures as low as 170° C. However, it is particularly preferred to conduct such reaction at temperatures of from at least 220° C. to 260° C. It has been found that the binders thus prepared frequently possess markedly superior solubility characteristics as compared with those binders resulting from reaction of the modified oils with the dicarboxylic acids or anhydrides, at temperatures of less than 220° C.

The drying or semi-drying oil reactants employed in the practice of the method of the present invention include, for example, soybean oil, linseed oil, tung oil, oiticica oil, dehydrated castor oil, safflower oil, tall oil, menhaden oil, sardine oil, or cod oil, or mixtures thereof. Drying oils obtained by the reaction of boron compounds, e.g., boric acid, with fatty acids or fatty-acid mixtures may similarly be employed; such products are commercially available, for example, under the trade designation "Unsapol" (see "Deutsche Farben Zeitschrift," 1960, p. 19).

The drying or semi-drying oil is modified, as indicated above, with a vinyl substituted aromatic compound. Vinyl aromatics which may be thus utilized to provide the modified oil addend include vinyl toluene, styrene or methyl styrene, the use of the former material being preferred.

The vinyl aromatic compound is reacted with the drying or semi-drying oil in the proportion such that the modified oil contains from 35%–55%, preferably from about 40%–50%, of the vinyl aromatic. Best results have been obtained when modified oil reactants are provided, incorporating the vinyl aromatic compound in an amount of 41%–46% by weight of the modified oil. The modified oils hereof, it will be noted, possess acid numbers below 10.

The acyclic unsaturated dicarboxylic acids or anhydrides with which the modified oils are reacted, in accordance with the present process, include a wide variety of stable dibasic acid reactants, e.g., fumaric acid, maleic acid, itaconic acid, citraconic acid, mesaconic acid, and/or the anhydrides of such acids. The acid reactant is reacted with the modified oil in an amount such that the acid number of the resulting adduct is at least 40 above the acid number of the modified oil reactant, the final acid number of such adducts ranging from about 43 to 165, preferably from about 66 to 100. Such acid numbers are suitably provided by reacting the acyclic unsaturated dicarboxylic acid or anhydride with the modified drying or semi-drying oil in proportions such that the adduct produced therefrom contains from about 4% to 19%, preferably from 6% to 11%, of the acid or anhydride.

As indicated hereinabove, the modified oil-acid reaction is conducted at temperatures of from 170° C. to 260° C., and most preferably between 220° C. to 260° C., in order to produce the desired adducts of the present invention.

The addition products thus prepared are made water-dispersible by neutralizing the same with a nitrogen base, viz., ammonia, or a primary, secondary or tertiary amine. Amines thus useful include open-chain aliphatic amines having from 1 to 4 carbon atom chains, e.g., triethyl amine, dimethyl ethanolamine, monoethanolamine, dipropylamino tris(hydroxymethyl) amino methane; cycloaliphatic amines such as N-methyl morpholine, N-phenyl morpholine, N-methoxy ethyl morpholine; or aryl amines such as N,N'-dimethyl aniline, or mixtures thereof. The nitrogen base effects neutralization of the acid groups of the dicarboxylic acid addend. Surprisingly, it has been found that the reaction of even 65% of the quantity of the nitrogen base stoichiometrically required to neutralize the acid radicals is sufficient to provide binder compositions having excellent water solubility.

The modified oil-acid addition product is dissolved in a lyotropically acting organic solvent, either before or, eventually, after neutralization with the nitrogen base, to form a clear, water-soluble binder in accordance with the invention. The lyotropically acting solvents include those alcohols having limited miscibility with water, such as butanol and pentanol and the corresponding monoalkyl ethylene or diethylene glycol ethers thereof (in which the alkyl groups thereof contain 4 or 5 carbon atoms). Such materials include those commercially available under the trade designations "Cellosolve" and "Carbitol," best results having been obtained by use of butyl Cellosolve (the monobutyl ether of ethylene glycol) as the lyotropically acting organic solvent thereof.

The binder compositions thus prepared may be mixed with emulsions, e.g., artificial resin emulsions, in order to combine the superior characteristics of the binder composition with those of the resin emulsion. Artificial resin emulsions which may thus be employed in conjunction with the water-dispersible binders hereof include polyvinyl acetate emulsions and polystyrene-butadiene emulsions.

It is further within the scope of the present invention to prepare coating compositions, by incorporating one or more pigments and/or filters in a binder composition prepared as described above. It has been found that paints thus prepared have excellent flow characteristics and exhibit good adhesion to substrates.

The following examples illustrate preferred forms of the process of the present invention.

EXAMPLE 1

A modified oil was prepared by copolymerizing linseed oil and vinyl toluene in proportions such that the linseed oil comprised 55%, and the vinyl toluene 45%, of the copolymerizate. The modified oil was highly viscous, having a viscosity of 105 p. at 50° C. Maleic anhydride was then added in an amount of 8% of the mixture, and the reaction mixture was heated at 240° C. for 5 hours in a nitrogen atmosphere. The product thus formed had an increased viscosity of 230 p. at 80° C.

27 parts of ethylene glycol monobutyl ether were thereafter mixed with 73 parts of the maleinized product, the viscosity of such product thereby decreasing to 8 p. at 50° C. Upon the further addition of 4.6 parts of 25% aqueous ammonia, a clear binder was produced which could be diluted with water in all proportions without introducing turbidity.

The binder was diluted with water to 50% non-volatile matter and siccativated with 0.05% cobalt and 0.05% manganese (calculated on solid content). The mixture was spread on a glass sheet with a doctor blade in a layer having, after drying, a 40μ thickness, and the drying time determined. The layer was dust-dry after 30 minutes, was not tacky after 5–6 hours, and had thoroughly dried after about 8 hours.

A white glossy paint was prepared from the binder composition obtained as described above by diluting 100 parts of an aqueous solution containing 70% of the non-volatile binder with 40 parts of water, and thereafter forming a paste by the addition of 140 parts of rutile titanium dioxide. The pigment paste was then ground in a three-roller mill and diluted with 100 parts of the binder composition and 210 parts of water. As a siccative a solution of cobalt and manganese naphthenate in butanol was added in an amount corresponding to the addition of 0.05% of cobalt and 0.05% of manganese, based on the weight of the non-volatile binder.

The paint was applied by brush to a non-sucking base in a layer having a thickness, after drying, of about 40μ. The flow characteristics of the paint were excellent. It was also noted that, after 20 minutes' drying time the layer was dust-dry, after one hour it was no longer tacky, and after 8–9 hours it was completely dry. The dried layer had a high gloss.

EXAMPLE 2

A modified oil was prepared by reacting 55 parts of a 90% soybean oil-10% wood oil mixture with 45 parts of vinyl toluene, by heating at 280° C. for 8 hours and maintaining the reaction mixture at such temperature for an additional hour. The viscosity of the thus modified oil was 80 p. at 50° C. To 100 parts of the copolymerizate thus formed was added 10 parts of fumaric acid at 150° C. preheated. The mixture was then heated for 5 hours at 240° C. under a nitrogen atmosphere.

After cooling, 41 parts of ethylene glycol monobutyl ether was added (viscosity at 20° C., 190 p.), and sufficient concentrated ammonia (10.4 parts therefrom) utilized to neutralize 90% of the carboxylic acid groups in the form of fumarate groups. The binder composition thus obtained could be diluted with water in all proportions without any turbidity.

For comparison, a binder was prepared utilizing the same procedure described above, but forming the modified oil by reaction of 70% of a mixture of 90% soybean oil and 10% wood oil, with 30% of vinyl toluene. A paint prepared as described above (by utilizing a modified oil including at least 35% of the vinyl aromatic reactant, in accordance with the invention) dried within 10 hours, whereas the corresponding paint incorporating the 70–30% modified oil materiol required 3 days' drying time. Moreover, after one year's storage, the composition incorporating only 30% vinyl toluene in the modified oil addend required at least 7 days' drying time, whereas the composition containing the modified oil having the 45% vinyl toluene content, still required only 10 hours for drying.

It will thus be seen that the present invention provides a process for the preparation of quick drying, water-dispersible binders for coating compositions, which binders possess excellent stability properties, superior flow characteristics, are water-soluble in all proportions, and form clear aqueous solutions. It will be understood that various changes may be made in the preferred embodiments described hereinabove without departing from the scope of the present invention; accordingly, it is intended that the preceding description should be construed as illustrative and not in a limiting sense.

What is claimed is:

1. A water-dispersible binder for a coating composition, which binder is prepared by a process consisting essentially of:
    (a) reacting a drying or semi-drying oil with a vinyl substituted aromatic compound selected from the group consisting of styrene, methyl styrene, or vinyl toluene, in proportions such that the vinyl substituted aromatic compound constitutes from 41% to 46% by weight of the resulting modified oil;
    (b) reacting said modified oil with an acyclic unsaturated dicarboxylic acid or anhydride at temperatures between 220° and 260° C. to produce an adduct containing from 6% to 11% by weight of said acid or anhydride and having an acid number of from 66 to 100;
    (c) admixing said adduct in a lyotropically acting organic solvent; and
    (d) dissolving said adduct with a nitrogen base selected from the group consisting of ammonia and primary, secondary, and tertiary amines in an amount of at least 65% by weight of the stoichiometric quantity of said base required for neutralization of the adduct.

2. The water-dispersible binder of claim 1, in which the drying or semi-drying oil reacted in the preparation of said binder is soybean-, linseed-, tung-, oiticica-, dehydrated castor-, safflower-, tall-, menhaden-, sardine-, or cod-oils, alone or in admixture.

3. The water-dispersible binder of claim 1, in which the vinyl substituted aromatic compound reacted in the preparation of said binder is vinyl toluene.

4. The water-dispersible binder of claim 1, in which the acyclic unsaturated dicarboxylic acid or anhydride reacted in the preparation of said binder is maleic anhydride.

5. The water-dispersible binder of claim 1, in which the vinyl substituted aromatic and acyclic unsaturated dicarboxylic acid materials reacted in the preparation of said binder are vinyl toluene and maleic anhydride, respectively.

6. The water-dispersible binder of claim 1, in which the lyotropically acting organic solvent admixed in the preparation of said binder is butanol, pentanol, or a monoalkyl ether of ethylene or diethylene glycol in which the alkyl group contains 4 or 5 carbon atoms.

7. The water-dispersible binder of claim 1, in which the nitrogen base reacted, and the lyotropically acting organic solvent admixed, during the preparation of said binder are ammonia and the monobutyl ether of ethylene glycol, respectively.

8. The water-dispersible binder of claim 1, which binder is prepared by the process consisting essentially of:
    (a) reacting a mixture of linseed oil and tung oil with vinyl toluene in proportions such that the vinyl toluene constitutes from 41% to 46% by weight of the resulting modified oil;
    (b) reacting said modified oil with maleic anhydride at temperatures between 220° and 260° C. to produce an adduct containing from 6% to 11% by weight maleic anhydride and having an acid number of from 66 to 100;
    (c) admixing said adduct in the monobutyl ether of ethylene glycol; and
    (d) dissolving said adduct with ammonia in an amount of at least 65% by weight of the stoichiometric quantity of ammonia required for neutralization of the adduct.

References Cited

UNITED STATES PATENTS

| 3,251,790 | 5/1966 | Christenson et al. | 260—18 |
| 3,023,177 | 2/1962 | Boucher | 260—291 X |
| 2,992,197 | 7/1961 | Boller | 260—22 |

OTHER REFERENCES

Varnish Constituents, Chatfield, Leonard Hill Ltd., London, 1953, pp. 76–78.

DONALD E. CZAJA, *Primary Examiner.*

C. W. IVY, *Assistant Examiner.*